United States Patent

[11] 3,621,120

[72] Inventors Jean Demartres
Paris;
Roger Teurnier, Rueil-Malmaison, both of France

[21] Appl. No. 776,026
[22] Filed Nov. 15, 1968
[45] Patented Nov. 16, 1971
[73] Assignee C.I.T.-Compagnie Industrielle Des Telecommunications
Paris, France
[32] Priority Nov. 15, 1967
[33] France
[31] 128385

[54] SYSTEM FOR AUTOMATICALLY CHARGING TELEGRAPHIC COMMUNICATIONS
13 Claims, 1 Drawing Fig.

[52] U.S. Cl. ........................................................ 178/2 F
[51] Int. Cl. ........................................................ H04l 15/26
[50] Field of Search ........................................... 178/2.6, 4.3

[56] References Cited
UNITED STATES PATENTS
2,993,085 7/1961 Demartres .................... 178/2

*Primary Examiner*—Kathleen H. Claffy
*Assistant Examiner*—Jan S. Black
*Attorney*—Craig, Antonelli & Hill

ABSTRACT: The present invention relates to a system for automatically charging telegraphic communications which permits the charging to start in the caller's office only on reception of two items of information, one of which is the international call-connected signal emitted by the receiving office, while the other is a combination of the international code No. 2, said system comprising a first device for identifying the call-connected signal and a second device for ordering the charging.

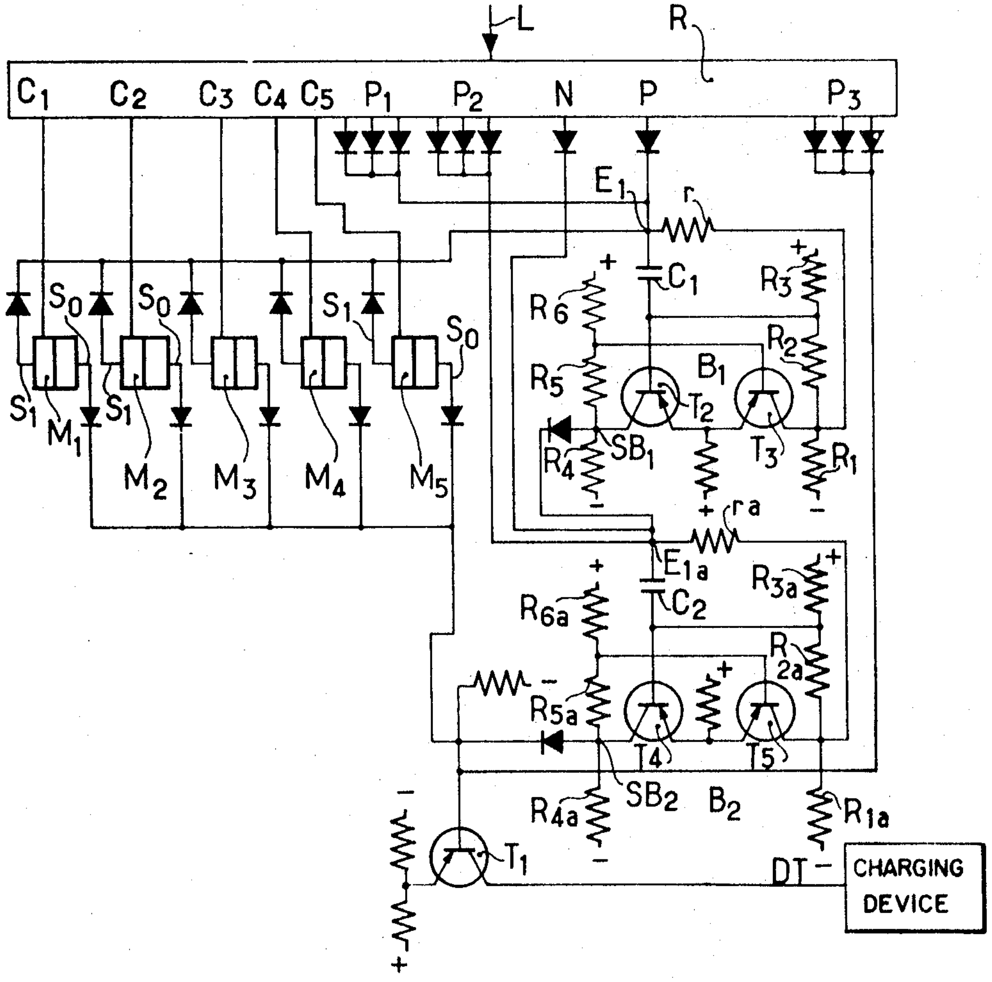
L
R
C1
C2
C3
C4
C5
P1
P2
N
P
P3
E1
r
C1
R3
R6
R2
B1
R5
T2
T3
SB1
R4
R1
ra
E1a
C2
R3a
R6a
R2a
R5a
T4
T5
SB2
B2
R4a
R1a
T1
DT
CHARGING DEVICE
S0
S1
M1
M2
M3
M4
M5

SYSTEM FOR AUTOMATICALLY CHARGING TELEGRAPHIC COMMUNICATIONS

The present invention relates to a system for automatically charging telegraphic communications which permits the charging to start in the caller's office only on reception of two items of information, one of which is the international call-connected signal emitted by the receiving office, while the other is a combination of the international code No. 2.

It is known that in some conventional charging systems the international call-connected signal consisting of a negative pulse of 150 milliseconds duration, is sent from the receiving office to the calling office to indicate that the available called subscriber has been found. It is from this signal that there are controlled, on the one hand, the connection of the two subscribers concerned and on the other hand the commencement of the charging for the communication. This double significance of the signal gives rise to considerable disadvantages:

In the first place, although the called subscriber's line is in order, since the signal is sent only after the answer-back, there is nothing to ensure that his teleprinter is in the operative state, since the supply to the motor may have been cut off, especially at night, which happens fairly frequently. The charge will therefore be sent to the caller although he will receive nothing.

In addition, the call-connected signal of 150 ms. does not permit the recognizing of the category to which the called subscriber belongs, that is to say, it does not enable a determination of whether the communication is chargeable or nonchargeable.

It is also known that other conventional systems do not commence charging for the communication until after complete analysis of the called subscriber's answer-back code in the caller's office, the answer-back code always being composed of a sequence of 20 characters transmitted at an automatic rate. This method avoids the starting of the charge for any modulation called "short text," such as proceed-to-transmit subscriber absent, busy, etc. The answer-back code is sent by the called subscriber's teleprinter when the two correspondents are in attendance (see applicants's French Pat. No. 1,131,283 of Sept. 16, 1955). These systems combine, in themselves, the conditions for good charging: necessity for the presence of the called subscriber, for his teleprinter to operate and for him to belong to a category of subscribers subject to charging.

The first character of the answer-back code always indicates the category of the called subscriber. If this character is "letters shift" the communication is chargeable, and if the character is "figures shift," "line shift," or "carriage return" the communication is not chargeable.

However, these systems are also attended by certain disadvantages:

In the first place, if a part of the connection between the calling and called subscribers (the latter may obviously be at any point in the national or foreign network) is effected by radio channel, error-correcting devices are employed to attenuate the effect of parasitic signals. Each error found necessitates the repetition of the last signals emitted. During each repetition, the retransmission from the receiving office is interrupted until the signals received are acknowledged as correct. Consequently, the reception in an office of an answer-back code coming from another office by radio channel may consist of 20 characters emitted at the maximum rate or may be fractionated in any way so as to have intervals of variable duration between groups of signals. It is therefore impossible in the latter case to detect an answer-back code by taking account of the total duration of its modulation.

In addition, in the case of international outgoing communications, it is not possible to connect a national caller directly with a foreign network as soon as the called subscriber has been found, because the signals are different and therefore the presence of an answer-back code of a particular length, commencing with a given character, is not ensured. It has therefore been necessary to provide in the international forwarding center a matching device which emits a long modulation to the internal national network, this modulation being considered by the latter as an answer-back code. Consequently, during the transmission of this sequence, by reason of signals which may emanate from the foreign network, circuits adapted to this network were necessary for replying thereto.

The object of the invention is to provide an improved charging system which obviates the disadvantages of the known systems. In accordance with the invention, this system comprises means for identifying the international call-connected signal, this signal then only indicating that the two subscribers are present, and means for identifying a "personalized" signal consisting only of the first character of the answer-back code of the called subscriber, this second signal indicating on the one hand that the called subscriber's teleprinter is operating and on the other hand, depending upon the nature of this first character, whether the communication is "chargeable" or "-nonchargeable."

This will, on the one hand, eliminate all doubts as to charging, whether justified or unjustified, which arise in systems based upon the use of only the international call-connected signal, and on the other hand it will resolve the working difficulties in radio links and in international links which have arisen in systems based upon the analysis of the modulation of the called subscriber's answer-back code.

In the case of radio links, since the first character serves only to initiate the charging, the remainder of the answer-back code may be fractionated in any way without disadvantage.

In the case of international communication with a foreign network, three working cases may be conceived, depending upon the signalling of the foreign network:

a. If the foreign network emits the call-connected signal and an answer-back code whose constitution is certain, the international forwarding center directly connects the caller with the foreign network without intervening.

b. If the foreign network emits the call-connected signal and an answer-back code whose composition is uncertain, the international center transmits to the internal network the "letters shift" combination immediately after the passage of the call-connected signal, and then connects the caller to the foreign network, the latter effecting the exchange of answer-back codes.

c. If the foreign network emits only the call-connected signal, the international center transmits to the internal network the "letters shift" combination immediately after the passage of the call-connected signal, and thereafter initiates the answer-back codes.

Finally, another advantage of the system according to the invention is that it makes it possible to utilize existing installations for the transmission of the call-connected signal in national communications in the same way as for international communications.

The system according to the invention is distinguished notably by the fact that it comprises a device for identifying the call-connected signal and a device for controlling the charging, the charging being commenced only after the successive reception in the calling subscriber's office of a call-connected signal emanating from the called subscriber's office, followed by a code combination given by the called subscriber's teleprinter or by another equivalent means.

In accordance with one feature of the invention, the detection of the signal for initiating the charging may be economically effected in members already comprising certain circuits employed at other times for other functions and more particularly in a telegraph signal receiver; there is associated with this receiver a circuit for the detection of the charging signal.

In accordance with one feature of the invention, the system comprises means employed for the detection of the charging signal, which are capable of measuring certain times from the initial instant when the telegraph signal receiver detects the presence of a negative polarity at the line, the instant 130 permitting the discrimination between a 30-second combination and the call-connected signal, while the instant 180 permits the discrimination between the call-connected signal and the clearing signal, the complete detection of the charging signal (call-connected pulse and first character) being determined after the counting of three combinations (two for the pulse and one for the first character), while the third combination may be separated from the first two by a period of time corresponding to the bringing of the called-subscriber's teleprinter into the operative condition and the said third combination preferably being the "letters shift."

In accordance with one feature of the invention, the system comprises a telegraph signal receiver which gives in addition certain information and a device composed of five memories corresponding to the five units of a character, diode gates, two bistable flip-flops and a transistor for controlling the charging, so that the call-connected signal followed by the "letters shift" combination can be recognized in the receiving process by successive discriminations.

In accordance with another feature of the invention, the diode gates are such that, in combination with the receiver, they suppress a polarity between two well-defined instants or from a predetermined instant.

In accordance with another feature of the invention, in combination with the signal receiver, while tests are made on the line at precise instants, any positive test results in a polarity at a certain wire and any negative test results in the same polarity at another wire.

In accordance with one feature of the invention, the device for identifying the call-connected signal comprises a first bistable flip-flop, the input of which is also connected to one of the gates, to certain outputs of the memories and to the positive test wire making possible the discriminating between a 30-second combination of the international code and the call-connected signal.

In accordance with one feature of the invention, the device for identifying the connecting signal comprises a second bistable flip-flop, the input of which is also connected to a second gate, to the negative test wire and to the output of the first flip-flop, making possible a discriminating between the call-connected signal and the clearing signal.

In accordance with one feature of the invention, the charging-control transistor has its base connected to three control wires, to a third gate, to memory outputs and to the output of the second flip-flop; it becomes conductive when no polarity arrives through the three control wires and then initiates the charging, all the conditions for the latter to take place then being satisfied.

Further features of the invention will become apparent from the following description of one embodiment of the invention, which is given only by way of nonlimiting example, the features appearing both from the text and from the drawing naturally forming part of the invention.

In the embodiment illustrated in the figure, the telegraph line L is connected to a telegraph receiver R of known type, which will not be described in detail here. A number of outputs $C_1$, $C_2$, $C_3$, $C_4$, $C_5$, N, P, $P_1$, $P_2$, and $P_3$ of the receiver R, which will be described in more detail hereinafter, are connected to devices capable of successive time discriminations, the final result of which is to initiate the charging if all the necessary conditions are satisfied. The outputs of the receiver R are the following:

The outputs $C_1$, $C_2$, $C_3$, $C_4$ and $C_5$ represent received character units and are connected to memory circuits $M_1$ to $M_5$, respectively; for each negative unit of the modulation, an order appears every twenty milliseconds at one of the outputs $C_1$ to $C_5$; these orders are recorded in the respective memories during the period of a cycle corresponding to a code combination and are erased before the next cycle; each negative unit sets up a ground potential at the output $S_0$ of the corresponding memory; conversely, each positive unit is characterized by a ground potential at the output $S_1$ of the corresponding memory.

From the instant when a negative polarity appears at the line, the latter is tested at the instants 10 ms., 30 ms., 50 ms., 70 ms., 90 ms., 110 ms. and 130 ms.; the result of this test appears at the wire N or P. If the test has found a positive polarity at the line, a ground potential appears at the point P; if the test has found a negative polarity at the line, a ground potential appears at the point N. The ground at one of the wires P and N remains there as long as a further test does not indicate a change of polarity at the line.

The gate $P_1$ is formed of three diodes in parallel; the ground potential present at this gate disappears between the instants 130 ms. and 140 ms.

The gate $P_2$ is formed of three diodes in parallel; the ground potential present at this gate disappears between the instants 180 ms. and 200 ms.

The gate $P_3$ is formed of three diodes in parallel; the ground potential present at this gate disappears after the reception of three characters (two being counted for the call-connected signal and one for the "letters shift" combination).

The device comprises two bistable flip-flops $B_1$ and $B_2$, five memory circuits $M_1$ to $M_5$ and a control transistor $T_1$.

The flip-flop $B_1$ consists of two transistors $T_2$ and $T_3$ and of a capacitor $C_1$. The collector of the transistor $T_3$ is connected on the one hand to the negative potential through a resistor $R_1$ and on the other hand to the positive potential through resistors $R_2$ and $R_3$ in series. The collector of the transistor $T_3$ is also connected to a point $E_1$ through a resistor $r$. The point $E_1$ is common to the electrode of the capacitor $C_1$ and to three circuits. It is connected to the point P through a diode, it is connected to the gate $P_1$ and it is connected to all the outputs $S_1$ of the memory circuits $M_1$ to $M_5$. The other electrode of the capacitor $C_1$ is connected to the base of the transistor $T_2$ and to the common point of the resistors $R_2$ and $R_3$. The output $SB_1$ of the flip-flop $B_1$ is connected through a diode to the input $E_{1a}$ of the flip-flop $B_2$. The point $E_1$ will not receive ground potential if the three circuits which are connected thereto cease simultaneously to impart this condition thereto, that is to say, if the following three conditions are simultaneously satisfied:

1. the line is negative, i.e., if no ground is present at point P,
2. a stage between the instants 130 ms. and 140 ms. has been reached, i.e., no ground is received from gate $P_1$, and
3. the five units received are negative, so that no ground is received from the memory circuits.

The flip-flop $B_1$ operates as follows: in the inoperative condition, the flip-flop is so biased as to provide a positive polarity signal at $SB_1$, that is to say, the transistor $T_2$ is conductive and the transistor $T_3$ is nonconductive. When ground is applied to $E_1$ by one of the three circuits, nothing happens, the resistance $r$ being very high. When the above-mentioned conditions for the suppression of ground at $E_1$ are subsequently satisfied, the capacitor $C_1$ becomes charged between the positive polarity of the emitter of the transistor $T_2$ and the negative polarity of $R_1$, but the flip-flop does not change condition because the capacitor $C_1$ is in the process of charging, and the positive polarity continues to be applied to $SB_1$. After the instant 140, the positive polarity is replaced at $E_1$ at least from gate $P_1$, which has the effect of bringing the base of the transistor $T_2$ to a positive potential and of rendering it nonconductive and rendering the transistor $T_3$ conductive. The positive polarity applied to $SB_1$ is then suppressed.

The flip-flop $B_2$ consists of two transistors $T_4$ and $T_5$ and of a capacitor $C_2$. The collector of the transistor $T_5$ is connected on the one hand to a negative potential through a resistor $R_{1a}$ and on the other hand to the positive potential through the resistors $R_{2a}$ and $R_{3a}$ in series. The collector of the transistor $T_5$ is also connected to the point $E_{1a}$ through a resistor $-r_1$. The point $E_{1a}$ is common to one electrode of the capacitor $C_2$ and to three circuits, the first circuit connecting the point $E_{1a}$ to the point N through a diode, the second circuit connecting the point $E_{1a}$ to the gate $P_2$ and the third circuit connecting the point $E_{1a}$ to the output $SB_1$ of the flip-flop $B_1$. The other electrode of the capacitor $C_2$ is connected on the one hand to the base of the transistor $T_4$ and on the other hand to the common point of the resistors $R_{2a}$ and $R_{3a}$. The collector of the transistor $T_4$ is connected on the one hand to a negative potential through a resistor $R_{4a}$ and on the other hand to a positive potential through resistors $R_{5a}$ and $R_{6a}$. The collector of the transistor $T_4$ is also connected through a diode to the base of the transistor $T_1$. The base of the transistor $T_5$ is connected to the common point of the resistors $R_{5a}$ and $R_{6a}$. The emitters of the transistors $T_4$ and $T_5$ are connected to a common point and receive positive potential through a resistor. The result of this arrangement is that the output $E_{1a}$ will not receive ground potential if the three circuits connected thereto simultaneously cease to apply this potential thereto, that is to say, if the following three conditions are simultaneously satisified:

1. The line is positive, i.e., no ground is present at point N,
2. a stage has been reached between the instants 180 and 200, i.e., no ground is received from gate $P_2$, and
3 the signal discriminated by the flip-flop $B_1$ is either the call-connected signal or the clearing signal, since no ground is received from point $SB_1$ at the output of flip-flop $B_1$.

The operation of the flip-flop $B_2$ is entirely similar to that of the flip-flop $B_1$, i.e., a positive polarity is applied by the output $SB_2$ of the flip-flop $B_2$ to the base of the transistor $T_1$ until the instant 200 ms. since gate $P_2$ will not reapply ground to point $E_{1a}$ until this instant; if at this instant the three aforesaid conditions have been satisfied, the positive polarity applied to $SB_2$ is suppressed.

The transistor $T_1$ brings about the initiation of the charging provided that none of the three circuits connected to its base applies positive potential thereto. The first circuit connects the base of the transistor $T_1$ to the outputs $S_0$ of the five memories $M_1$ to $M_5$; the second circuit connects the base of the transistor $T_1$ to the gate $P_3$ and the third circuit connects the base of the transistor $T_1$ to the output $SB_2$ of the flip-flop $B_2$. The base of the transistor $T_1$ will not receive positive potential if, simultaneously, no potential is applied by these circuits, that is to say, if the following three conditions are satisfied:

1. the last combination received is "letters shift," which comprises no negative unit and therefore gives no ground at $S_0$,
2. three characters have been received, so that no ground is received from gate $P_3$, and
3. the signal discriminated by the flip-flop $B_2$ is determined to be the call-connected signal, so that no potential is received from point $SB_2$.

Thus, the three conditions being satisfied, the transistor $T_1$ becomes conductive and a potential is applied to the control wire $D_t$ to initiate the charging.

It will be seen: (a) that the flip-flop $B_1$, in operating, has established that the signal received at this instant can only be the call-connected signal or the clearing signal; (b) that the flip-flop $B_2$, in operating, has established that the signal received at this instant can only be the call-connected signal; and (c) that the transistor $T_1$, in becoming conductive, has established that, the call-connected signal and the "letters shift" combination having been received in three characters, the charging can commence.

The discriminations have therefore been gradually effected. The chronological operation is given in the following, assuming that there arrive at the line:

1. The call-connected signal sent by the receiving office to signal the fact that the two correspondents are present.
2. The "letters shift" character to signal that the called subscriber's teleprinter is operating and that the communication is chargeable.

The call-connected signal consists of a negative current pulse of 150 milliseconds. As soon as the negative current pulse appears at the line, the device according to the invention is in the operative condition. Taking into account the accepted tolerances of ±11 ms. over the length of the signal and a distortion of 40 percent, the length of the call-connected signal may vary from a minimum of 131 ms. to a maximum of 169 ms. On the other hand, the code character having the greatest negative length (start and the five consecutive units) being the 30-second combination, the total length of the negative pulse, taking into account the distortion of 40 percent, is at most 128 milliseconds. It is therefore necessary to be able to distinguish between a negative pulse of 128 ms. and a negative pulse of 131 ms. This result is obtained by observing the state of the line at the instant 130 ms. (this instant 130 ms. has been chosen for reasons of convenience, but any instant between the limits 128 ms. and 131 ms. could obviously be chosen). If the line is positive, it is an indication of a 30-second combination and if the line is negative it is an indication of the call-connected signal. This test is applied to the flip-flop $B_1$ by the wire P, which must not give a positive potential but should provide a ground potential in the case of the call-connected signal. If it does, the capacitor $C_1$ will not charge and flip-flop $B_1$ will not change state. The flip-flop $B_1$ takes account of two other facts in order to make its decision:

1. All the units received $C_1$ to $C_5$ are negative (and therefore there is no ground at the outputs $S_1$).
2. At the instant 130, the ground potential normally applied by the gate $P_1$ is removed, whereby the condition is created with capacitor $C_1$ charged for the operation of the flip-flop, the other two conditions being satisfied.

Thus, the change of position of the flip-flop $B_1$ means that the negative pulse received is longer than 130 ms., and it can therefore only be the call-connected signal or the clearing signal, the length of which is at least 300 ms. A further discrimination is therefore necessary to establish whether it is in fact a question of the call-connected signal as opposed to the clearing signal, and this is the duty of the flip-flop $B_2$.

In order to effect this discrimination, the state of the line is observed at an instant when the call-connected signal has with certainty been completed, for example at the instant 180 ms. (this instant 180 ms. has been chosen for reasons of convenience, but any instant between 169 and 300 ms. could obviously be chosen). If at the instant 180 the line is positive, it is in fact a question of the call-connected signal, but if it is negative, it is the clearing signal which is proceeding. The state of the line is supplied to the flip-flop $B_2$ at the instant 180 by the wire N. If the line is positive, there is no ground potential at this wire N and consequently it is a question of the call-connected signal. However, the flip-flop $B_2$ takes account of two other facts in order to make its decision:

1. The flip-flop $B_1$ has responded in the affirmative (therefore there is no ground at the output $SB_1$).
2. Ground potential is removed from gate $P_2$.

At the instant 200 ground is again applied to the gate $P_2$, whereby the condition is created with capacitor $C_2$ charged for the operation of the flip-flop, the other two conditions being satisfied. The change of position of the flip-flop $B_2$ therefore means that the negative pulse received is shorter than 180 ms. and consequently that it cannot be a question of the clearing signal.

In accordance with the invention, since the charging can only be started after the reception of the call-connected signal and of the "letters shift" character, it is therefore necessary to pay attention to the reception of the latter character. It is known that the "letters shift" character has its five significant units positive; this character may arrive some time after the call-connected signal, since it is assumed that the called teleprinter has been set in operation. The assurance of the reception of this character will be given to the transistor $T_1$ on the one hand owing to the fact that the gate $P_3$ no longer provides a positive potential after the reception of the third character, and on the other hand by reason of the fact that this character has no negative unit and therefore provides no positive potential at the outputs $S_0$ of the memories $M_1$ to $M_5$. Finally, the flip-flop $B_2$ having suppressed the positive potential at its output $SB_2$ owing to the fact that it has discriminated the call-connected signal, all the conditions are then satisfied for the transistor $T_1$ which becomes conductive to give the signal for starting the charging.

It is obvious that it is not possible to consider all cases in which the reception of certain signals at the line would not result in the charging order being given. However, it will be appreciated from the foregoing description of the operation that, since the discrimination effected depends upon the preceding discrimination and the process continues step-by-step, the reception of inadequate signals would stop the advance of the device and the charging order would not be given. In addition, it is conceivable that if the reception of the third character took place too late to manifest itself after the reception of the call-connected signal, a time cam would release the receiving member so as to avoid unnecessary blocking.

Any construction based upon the aforesaid principles of tests in time at exactly chosen instants and on successive discriminations, even by other means (electromechanical relays, magnetic cores, magnetic amplifiers, different arrangements of transistors, etc.) would not depart from the scope of the invention provided that the initiation of the charging is obtained therein by successive reception of the call-connected signal and of a code combination.

Finally, the system according to the invention may be designed to start the charging on any code combination and not only on "letters shift." In this case, it would be necessary to omit the connection between the base of the transistor $T_1$ and the outputs $S_0$ of the memories $M_1$ to $M_5$. In the particular case where a combination other than the "letters shift" is chosen to start the charging, it would be necessary to modify accordingly the circuit connecting the base of the transistor $T_1$ to the outputs of the memories.

It is also possible without departing from the scope of the invention to employ bistable flip-flops having different circuit arrangements from the one of known type indicated in the description.

Generally speaking, the invention is in no way limited to the embodiment described and illustrated, which has been referred to only by way of example. More particularly, it is possible without departing from the scope of the invention to modify certain arrangements or to replace certain means by equivalent means.

I claim:

1. A system for the automatic charging of telegraphic communications, notably in an automatic telegraph network for interconnecting calling and called subscriber stations, upon receipt of a call-connected signal of known duration and polarity and at least a portion of an answer back code on the line at the calling subscriber station from the called subscriber station, comprising:
- a device for effecting the charging of the telegraphic communication at the calling subscriber station,
- first detecting means for detecting receipt of said call-connected signal,
- second detecting means for detecting receipt of at least a portion of an answer back code from the called subscriber station indicating presence of the called subscriber, operation of the called subscriber station, and whether the called subscriber is chargeable or nonchargeable, and
- control means responsive to said first detecting means and said second detecting means for actuating said device.

2. System according to claim 1, characterized in that said timing means for identifying the call-connected signal, the latter consisting of a pulse whose length may vary between a minimum value and a maximum value, is composed of two bistable flip-flops, the output of the first being connected to the input of the second and the output of the second being connected to said control means, first receiving means including three condition indicating elements connected to the input of said first flip-flop for discriminating between the call-connected pulse of minimum length and a first code combination of different length during a first time period, and second receiving means including three additional condition indicating elements connected to the input of said second flip-flop for discriminating between the call-connected pulse of maximum length and a clearing pulse of greater length during a second time interval, so that the successive change of state of the first flip-flop and the second flip-flop provides identification of the reception of the call-connected signal as opposed to either the first code combination of different length or the clearing pulse.

3. System according to claim 2 wherein said first code combination of different length from said call-connected signal is the code combination 32, being of shorter duration than said call-connected signal.

4. System according to claim 2, characterized in that said control means comprises a control transistor whose base is connected to said second flip-flop, and said second detecting means includes a character-counting circuit and a character designation circuit for identifying the character of a combination signal, wherein the transistor becomes conductive and the charging order is given when a common prescribed output is provided from said second flip-flop, said character-counting circuit and said character designation circuit.

5. System according to claim 4, wherein said character designation circuit for identifying a character includes five memory elements corresponding to the five units of the character, respectively, said memory elements being connected to the line for receipt of the character and to said control means for indicating the value of the units of the character.

6. System according to claim 3, characterized in that it comprises a telegraph signal receiver having outputs connected to said first detecting means and said second detecting means which are capable of successive time and character designations, a first group of said outputs providing character designations being connected to five memories forming part of said detecting means and corresponding to the five units of a character, and a second group of said outputs including a pair of timing lines each having three diode gates, a negative test wire, a positive test wire and a character-counting output, said first bistable flip-flop of said first detecting means for identifying the call-connected signal being connected to one of said timing lines, to outputs of the memories and to the positive test wire, so as to discriminate between the 30-second combination of the international code and the call-connected signal, said second bistable flip-flop of said first detecting means for identifying the call-connected signal being connected to the other timing line, to the negative test wire and to the output of said first flip-flop, so as to discriminate between the call-connected signal and the clearing signal, said control means being connected to said character-counting output, to outputs of the memories and to the output of said second flip-flop.

7. System according to claim 6, characterized in that said one timing line effects a suppression of ground potential between the instants 180 and 200 ms., and said character-counting output effects a suppression of positive potential after the reception of three characters of a combination signal received.

8. System according to claim 1, characterized in that said first detecting means comprises first means for measuring the condition of the line at the instant 130 ms. from the initial instant after detection of the presence of a negative polarity at the line permitting the discrimination between a 30-second character and the call-connected signal, second means responsive to said first means for measuring the condition of the line at the instant 180 ms. from the initial instant after detection of the presence of a negative polarity at the line permitting the discrimination between the call-connected signal and the clearing signal, and third means responsive to said second means for effecting the generation of the charging signal order after the counting of two characters for the pulse and one combination for the first character of the answer back code, it being possible for the third character to be separated from the first two by a period of time corresponding to the bringing of the called-subscriber s teleprinter into operation, and the third character preferably being the "letters shift."

9. System for automatically charging telegraphic communications, comprising first means for identifying a call-connected signal by discriminating said call-connected signal from a 30-second character of the international code and a clearing signal through periodic timed sampling of the telegraphic communication to detect the relative length of a signal of constant polarity, the said signal indicating that the two subscribers are present, second means for identifying the first character of the answer back code of the called subscriber, the said second signal indicating that the called subscriber's teleprinter is operating and whether the communication is chargeable or not, and third means responsive to said first and second means for ordering the charging of the communication.

10. System as defined in claim 9 wherein said first means comprises polarity-indicating means indicating the instantaneous polarity of received signals, first timing means indicating the expiration of a first time period, second timing means indicating expiration of a second time period greater than said first time period, a first bistable flip-flop having its input connected to said polarity-indicating means, to said first timing means and to an output of said second means indicating the polarity of the received signal at various intervals of said first time period, and a second bistable flip-flop having its input connected to said polarity indicating means, to said second timing means and to the output of said first bistable flip-flop.

11. System as defined in claim 10 wherein said second means comprises memory means including individual memory units for storing the received signal at respective intervals corresponding to individual signal character times, outputs of said memory units being connected to said first bistable flip-flop, and character indicating means indicating receipt of a prescribed number of signal characters.

12. System as defined in claim 11 wherein said third means comprises switching means having its input connected to outputs of said memory units, to said character-indicating means and to the output of said second bistable flip-flop for selectively effecting said charging in response to the condition of the circuits connected thereto.

13. Method for effecting the charging of telegraphic communications in a system providing for generation of code character combinations, a call-connected signal of constant polarity for a duration exceeding all code character combinations, an answer back character combination including a first character indicating the category of the called subscriber, and a clearing pulse of duration greater than the call-connected signal and of opposite polarity thereto comprising:

testing for the presence and polarity of a signal after expiration of a first time interval after initial receipt of the signal in excess of the duration of the code character combination of maximum duration and less than the duration of said clearing pulse, testing for the presence and polarity of a signal after expiration of a second time interval after initial receipt of the signal in excess of the duration of the call-connected signal and less than the duration of said clearing pulse, detecting polarity of the characters of the answer back character combination, and initiating the charging of the communication in response to detection of said call-connected signal as a result of the testing after said second time interval and detection of a first character in said answer back character combination having a polarity indicating a charging category.

* * * * *